(12) United States Patent
Smith et al.

(10) Patent No.: US 10,452,059 B2
(45) Date of Patent: Oct. 22, 2019

(54) METHOD FOR REPRODUCING A PRODUCTION PROCESS IN A VIRTUAL ENVIRONMENT

(71) Applicant: DE-STA-CO Europe GmbH, Oberursel (DE)

(72) Inventors: John Smith, West Midlands (GB); Willian Duncan Morgan, Shropshire (GB); Andrew Neil Bickford, Oswestry (GB)

(73) Assignee: DE-STA-CO Europe GmbH, Oberursel (DE)

( * ) Notice: Subject to any disclaimer, the term of this patent is extended or adjusted under 35 U.S.C. 154(b) by 42 days.

(21) Appl. No.: 15/122,940

(22) PCT Filed: Feb. 27, 2015

(86) PCT No.: PCT/DE2015/100079
§ 371 (c)(1),
(2) Date: Sep. 1, 2016

(87) PCT Pub. No.: WO2015/131878
PCT Pub. Date: Sep. 11, 2015

(65) Prior Publication Data
US 2017/0075347 A1 Mar. 16, 2017

(30) Foreign Application Priority Data
Mar. 3, 2014 (DE) .......... 10 2014 102 773

(51) Int. Cl.
*G05B 19/418* (2006.01)

(52) U.S. Cl.
CPC .......... *G05B 19/41885* (2013.01); *G05B 2219/32014* (2013.01); *G05B 2219/39451* (2013.01); *Y02P 90/26* (2015.11)

(58) Field of Classification Search
None
See application file for complete search history.

(56) References Cited

U.S. PATENT DOCUMENTS 5,023,800 A * 6/1991 Carver ............... G05B 19/4097
700/182
2002/0120921 A1* 8/2002 Coburn ............ G05B 19/41885
717/140

(Continued)

FOREIGN PATENT DOCUMENTS

DE 10128015 A1 12/2001
EP 1701233 A2 9/2006

OTHER PUBLICATIONS

International Search Report (in German with English Translation) for PCT/DE2015/100079, dated Jun. 11, 2015; ISA/EP.

*Primary Examiner* — Isaac T Tecklu
(74) *Attorney, Agent, or Firm* — Harness, Dickey & Pierce, P.L.C.

(57) ABSTRACT

A method for reproducing a production process in a virtual environment, has a production facility and a workpiece virtually interacting with each other during the production process. The virtual environment, for the workpiece, is generated out of previously computed three-dimensional data. Scanning an actual production facility is scanned with a scanner. The virtual environment for the actually existing production facility is generated out of three-dimensional data acquired by the scanner.

6 Claims, 1 Drawing Sheet

(56) References Cited

U.S. PATENT DOCUMENTS

| | | | | |
|---|---|---|---|---|
| 2006/0241791 | A1* | 10/2006 | Pokorny | G05B 17/02 |
| | | | | 700/67 |
| 2007/0035952 | A1* | 2/2007 | Laffert-Kobylinski | ...................... |
| | | | | G02B 3/005 |
| | | | | 362/317 |
| 2011/0313734 | A1* | 12/2011 | Grosch | G05B 19/41885 |
| | | | | 703/1 |
| 2012/0290130 | A1 | 11/2012 | Kapoor | |
| 2013/0041629 | A1* | 2/2013 | Fisker | A61C 13/0004 |
| | | | | 703/1 |
| 2014/0160115 | A1* | 6/2014 | Keitler | G01B 11/00 |
| | | | | 345/419 |
| 2014/0200706 | A1* | 7/2014 | Pruschek | G05B 17/02 |
| | | | | 700/159 |
| 2014/0317037 | A1* | 10/2014 | Andrews | G06N 5/02 |
| | | | | 706/46 |
| 2015/0054918 | A1* | 2/2015 | Lee | H04N 13/0221 |
| | | | | 348/46 |
| 2015/0127131 | A1* | 5/2015 | Herrman | G05B 19/4097 |
| | | | | 700/98 |
| 2016/0071318 | A1* | 3/2016 | Lee | G06T 17/00 |
| | | | | 345/419 |
| 2016/0262442 | A1* | 9/2016 | Davila | A23P 1/085 |
| 2016/0356890 | A1* | 12/2016 | Fried | G01S 17/023 |
| 2017/0014945 | A1* | 1/2017 | Fraser | B23K 26/0066 |
| 2017/0236299 | A1* | 8/2017 | Valkenburg | G06T 7/73 |
| | | | | 382/106 |

* cited by examiner

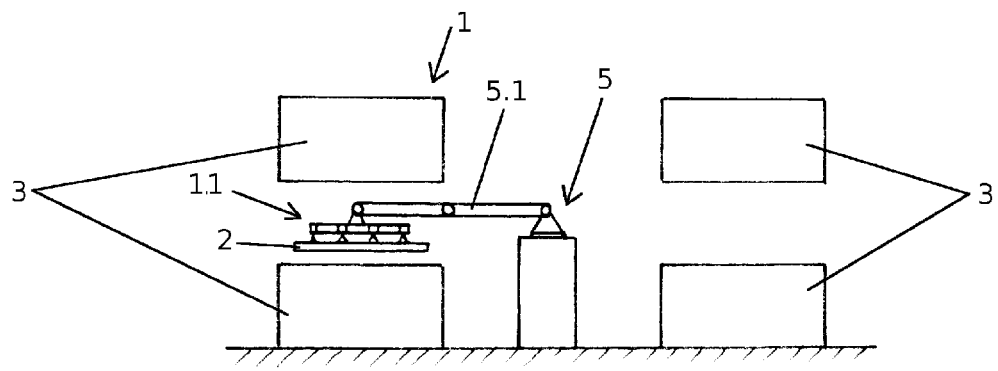
FIG. 1
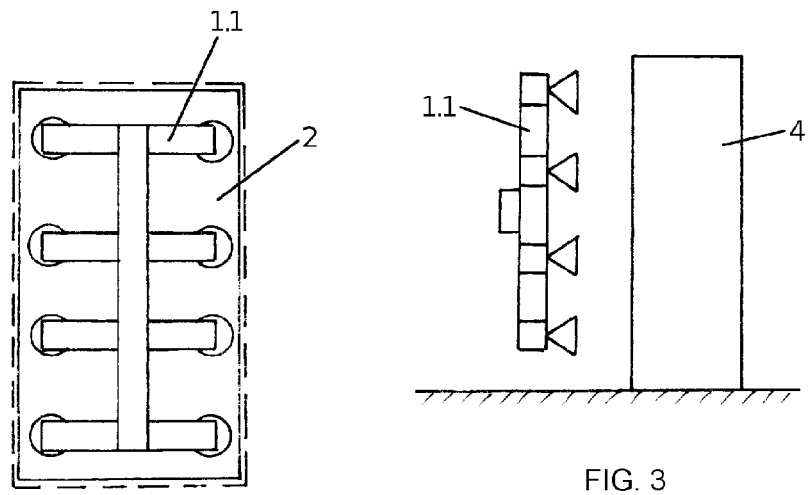
FIG. 2
FIG. 3
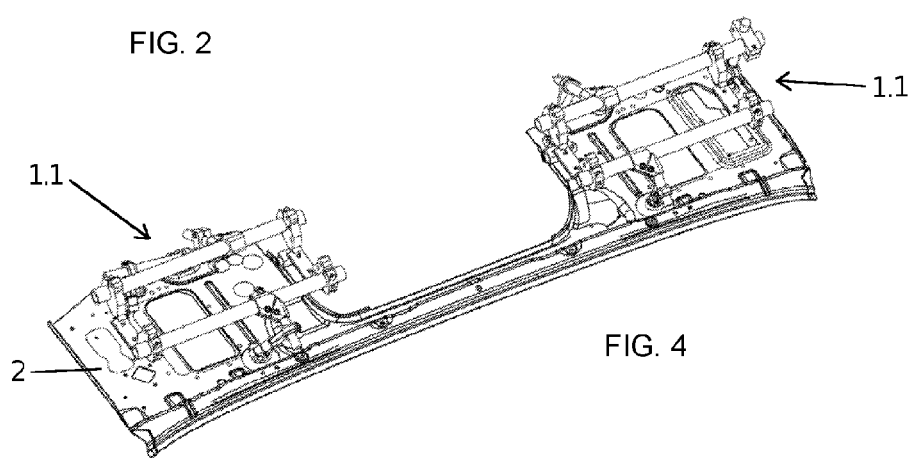
FIG. 4

METHOD FOR REPRODUCING A PRODUCTION PROCESS IN A VIRTUAL ENVIRONMENT

CROSS REFERENCE TO RELATED APPLICATIONS

This application is a U.S. National Phase Application under 35 U.S.C. 371 of International Application No. PCT/DE2015/100079 filed on Feb. 27, 2015 and published in German as WO 2015/131878 A1 on Sep. 11, 2015. This application claims priority to German Application No. 10 2014 102 773.6 filed on Mar. 3, 2014. The entire disclosures of all of the above applications are incorporated herein by reference.

The disclosure relates to a method for reproducing a production process in a virtual environment.

A method is known in the art for reproducing a production process in a virtual environment. Here a production facility and a workpiece are made to interact with each other during the production process. The virtual environment is generated out of previously computed three-dimensional data for the workpiece.

The formulation "made to interact with each other" as used above is understood to mean that the production facility and the workpiece come into contact in the broadest sense during the production process. The production facility is required to perform at least one production step on the workpiece.

The term "reproduce" is understood, in particular, to mean the graphic reproduction of the production process on a screen or monitor. The parts belonging to the production process, such as the workpiece and production facility, are displayed in a three-dimensional space, specifically the virtual environment. Alternatively, reference can also be made to a computer simulation where the production process takes place not in reality, but only in the processor of the computer.

Such simulations serve varying purposes. For example, there are production processes where the entire process is simulated in a virtual reality before turning it into reality. This enables a check as to whether the latter would run its course as desired. However, there are also situations where a production process that already exists in reality is displayed in the virtual environment. The simulation can then be used to perform a virtual test on parameter changes.

One precondition for simulation is always that the three-dimensional data of the workpiece and production facility be present in a form that the computer can process. In theory, this is routinely the case. Both the workpiece and production facility are already developed today directly on the computer. The computer directly yields the three-dimensional data of the mentioned components.

In practice, however, this is routinely not that simple. In particular, as it relates to the production facility, consisting of multiple parts, its spatial configuration is routinely geared toward the workpiece. Therefore, it must be remembered that the actual spatial arrangement of the numerous individual components of the production facility relative to each other is associated with a significant time outlay in a virtual environment due to the necessary empirical values during the arrangement process.

Consequently, is an object of the disclosure to improve a method for reproducing a production process of the kind mentioned at the outset, specifically as it relates to preparing the three-dimensional data of the production facility. This object is achieved by a method for reproducing a production process of the kind mentioned at the outset by virtually interacting a production facility and a workpiece with each other during the production process. The virtual environment, on the one hand, is generated out of previously computed three-dimensional data for the workpiece. An actual production facility is scanned with a scanner. The virtual environment is generated out of the three-dimensional data for the actually existing production facility acquired by the scanner.

Therefore, the disclosure that provides the virtual environment, in addition to the computed three-dimensional data for the workpiece, is generated from the three-dimensional data acquired, via scanner, for an actually existing production facility.

In other words, the disclosure involves generating three-dimensional data for the actual required production facility adjusted to the workpiece, not in a virtual world, but rather with a so-called 3D scanner. To this end, the production facility is first put together in real terms out of a plurality of individual components. Thus, it is spatially oriented to the workpiece.

In an advantageous further development of the method according to the disclosure, the workpiece itself is generated as an optical projection in a developmental space based upon its three-dimensional data. The actually existing production facility is then oriented and adjusted to this projection. The special advantage to this approach lies in the fact that the buyer of the production facility often requires the workpiece itself. Accordingly, the buyer is unable or unwilling to provide the latter to the manufacturer of the production facility. The projection nevertheless enables the manufacturer of the production facility to adjust and build the production facility in real terms. Specifically, the production facility can be built without, in reality, having the workpiece in hand.

Alternatively, if the workpiece is actually present, the production facility can also be built oriented to the actually existing workpiece.

The key in both approaches is for the production facility, if it actually exists, to be spatially scanned and measured with a 3D scanner. The three-dimensional data for the production facility acquired in the process is then relayed to the virtual environment already including the workpiece. Thus, the entire virtual environment including the workpiece and production facility is finally available for the purposes mentioned at the outset.

Other advantageous further developments of the method according to the disclosure may be gleaned from the dependent claims.

For the sake of completeness, reference will also be made to the following state of the art.

Patent document DE 10 2005 009 437 A1 is a method (see in particular paragraph [0063] and FIG. 10), where the actually existing production facility (in particular a gripper) is simulated by a person with the help of virtual elementary geometries. Thus, the formed object can then be used in a virtual environment. In particular, the method according to the disclosure differs from the above in that the production facility (in particular a gripper) is not virtually simulated by a person. Rather, it is individually built while oriented to the workpiece to be handled by the production facility, and then scanned for use in the virtual environment.

Patent document DE 102 40 392 A1 is a method for measuring virtual objects that do not actually exist for objects in a real environment. The latter also makes no mention of individually building a production facility oriented to the workpiece to be handled by the production facility, and then scanning it for use in a virtual environment.

Patent document DE 10 2007 045 835 A1 is a method for displaying a virtual object in a real environment. Thus, collisions arising between virtual objects and real objects, while blending with a real environment, can be displayed in a largely realistic manner. The approach according to the disclosure is not disclosed.

A method according to the disclosure, including its advantageous further developments will be explained in greater detail below based on the graphic representation of two exemplary embodiments.

BRIEF DESCRIPTION OF THE DRAWINGS

FIG. 1 is a schematic side view of part of a production line with a robot-actuated production facility designed as a gripper device for removing a workpiece from a first tooling arrangement and feeding the workpiece to a second tooling arrangement;

FIG. 2 is a schematic top view of the production facility designed as a gripper device according to FIG. 1, including a workpiece;

FIG. 3 is a schematic side view of the gripper device and 3D scanner; and

FIG. 4 is a perspective view of a workpiece (deep-drawn sheet metal part) with two parts of a gripper device.

Based on two examples, the figures illustrate details of the method according to the disclosure for reproducing a production process in a virtual environment. This method includes a production facility 1 and a workpiece 2 made to interact with each other during the production process. The virtual environment is generated out of three-dimensional data for the workpiece 2, computed beforehand.

For purposes of better illustration, FIGS. 1 to 3 proceed in a highly simplified (and thus in actuality unrealistic) manner from a flat-surfaced workpiece 2. On the left-hand side of the image workpiece 2 is removed from a first tooling arrangement 3, in order to then be placed into a second tooling arrangement 3, depicted on the right-hand side of the image. These tooling arrangements 3 typically involve (large) deep-drawing presses. For example, metal sheets are deep-drawn for automotive manufacture. The virtual environment mentioned at the outset is also preferably generated out of previously computed three-dimensional data for the tooling arrangement 3. A robot 5 is situated between the tooling arrangements 3. The production facility 1 in this case (preferably) designed as a gripper device 1.1 is moved by means of an arm 5.1 of the robot 5. It optionally removes the workpiece 2 from the tooling arrangement 3 or feeds the workpiece 2 to the tooling arrangement 3.

By way of illustration, FIG. 4 shows a real workpiece. Starting points for the suction cups of the gripper device 1.1 (as evident) are situated in very different planes on the workpiece 2. The suction cups are inclined relative to each other. The gripper device 1.1 is generated out of a plurality of individual parts (in particular connecting elements, support elements and suction cup elements). The parts are adjusted to the workpiece and can be fixed relative to each other in various positions. Let it further be noted that the two parts of the gripper device 1.1, according to FIG. 4, are in reality also joined together by means of a connecting element (not shown here).

In addition to the aforementioned known method, it is now essential for the method according to the disclosure that the virtual environment be generated out of the three-dimensional data for an actually existing production facility 1. The data was acquired with a scanner.

FIG. 3 schematically depicts such a scanner, in particular a 3D scanner 4. A so-called 3D laser scanner is especially preferably used to scan the production facility 1. For the sake of simplicity, reference is made to Wikipedia with respect to such known scanners. Specifically to the following, permanent address http://de.wikipedia.org/w/index.php?title=Laserscanning&oldid=109718171, which discloses as follows: "3D laser scanning delivers as a result three-dimensional point clouds, and hence a complete image of the measured scene. Based on the point cloud, either individual dimensions, e.g., length and angles, are determined, or a closed surface of triangles is constructed (intermeshing or meshing) and used in 3D computer graphics for visualization, for example."

Before the production facility 1 is scanned, however, it must first be objectively built and adjusted. As explained at the outset, this can either be done directly on a present, actually existing workpiece 2 (illustrated by the solid lines on FIG. 2), or based on an optical, three-dimensional projection of the workpiece 2 (illustrated by the dashed lines on FIG. 2). To this end, use is made of a so-called "cave automatic virtual environment", i.e., a space for projecting a three-dimensional illusory world, for example of the kind described in Wikipedia at the permanent address http://de.wikipedia.org/w/index.php?title=Cave Automatic Virtual Environment&oldid=116 809189.

After the production facility 1, that includes numerous individual parts and in this regard is not easy to adjust in a virtual environment of a computer, has been built and adapted to the workpiece 2, it is completely, meaning three-dimensionally, scanned. The data generated in the process is converted into a suitable data format and relayed to the virtual environment, which up to that point only knew the workpiece data, and possibly the tooling arrangement data. Thus a test can then be directly performed to determine whether the production facility 1 corresponds to the prescribed requirements, for example so that collisions with the tooling arrangements 3 do not take place while moving the robot arm 5.1.

The invention claimed is:

1. A method for reproducing a production process in a virtual environment, comprising:
    generating the virtual environment of an actual three dimensional workpiece from previously computed three-dimensional data for the actual workpiece;
    generating an optical projection of the workpiece in a developmental space based upon the three dimensional data;
    scanning an actual production facility with a three dimensional scanner;
    generating the virtual environment for the existing actual production facility out of three-dimensional data acquired by the scanner; and
    virtually interacting the generated virtual environment for the actual production facility and the actual workpiece and the optical projection of the workpiece with each other during the production process.

2. The method according to claim 1, further comprising building the production facility and orientating it to the actually existing workpiece or to an optical projection of the workpiece before acquiring the three dimensional data from the scanner.

3. The method according to claim 1, further comprising manufacturing the production facility out of a plurality of individual parts that are adjusted to the workpiece, and can be fixed relative to each other in various positions.

4. The method according to claim 1, wherein the scanner is a 3D laser scanner.

5. The method according to claim 1, further comprising, designing the production facility as a gripper device, and the workpiece is fed to or removed from a tooling arrangement during the production process by the gripper device; and generating a virtual environment out of previously computed three-dimensional data of the tooling arrangement.

6. The method according to claim 5, further comprising, moving the gripper device by an arm of a robot to feed the workpiece to the tooling arrangement or remove the workpiece from the tooling arrangement.

* * * * *

UNITED STATES PATENT AND TRADEMARK OFFICE
CERTIFICATE OF CORRECTION

| | | |
|---|---|---|
| PATENT NO. | : 10,452,059 B2 | Page 1 of 1 |
| APPLICATION NO. | : 15/122940 | |
| DATED | : October 22, 2019 | |
| INVENTOR(S) | : John Smith et al. | |

It is certified that error appears in the above-identified patent and that said Letters Patent is hereby corrected as shown below:

In the Claims

<u>Column 4</u>
Line 59, Claim 1    delete "and" and insert --or--

Signed and Sealed this
Twenty-fifth Day of August, 2020

Andrei Iancu
*Director of the United States Patent and Trademark Office*